United States Patent
Gay et al.

(10) Patent No.: US 11,451,671 B2
(45) Date of Patent: Sep. 20, 2022

(54) IDENTIFICATION OF 5G NON-STANDALONE ARCHITECTURE TRAFFIC ON THE S1 INTERFACE

(71) Applicant: EXFO Solutions SAS, Saint-Jacques-de-la-Lande (FR)

(72) Inventors: Christophe Gay, Rennes (FR); Thierry Boussac, Rennes (FR); Christopher Daumer, Rennes (FR)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 49 days.

(21) Appl. No.: 17/229,075

(22) Filed: Apr. 13, 2021

(65) Prior Publication Data

US 2021/0344803 A1   Nov. 4, 2021

Related U.S. Application Data

(60) Provisional application No. 63/017,342, filed on Apr. 29, 2020, provisional application No. 63/070,338, filed on Aug. 26, 2020.

(51) Int. Cl.
*H04M 15/00* (2006.01)
*H04W 24/08* (2009.01)

(52) U.S. Cl.
CPC ....... *H04M 15/58* (2013.01); *H04M 15/8214* (2013.01); *H04W 24/08* (2013.01);
(Continued)

(58) Field of Classification Search
CPC ............. H04M 15/58; H04M 15/8214; H04M 2215/2026; H04M 2215/32;
(Continued)

(56) References Cited

U.S. PATENT DOCUMENTS 9,538,563 B2   1/2017  Wang et al.
9,763,151 B2   9/2017  Kim
(Continued)

FOREIGN PATENT DOCUMENTS

EP   2 469 761 A1   6/2012
WO   2018/190689 A1   10/2018
(Continued)

OTHER PUBLICATIONS

Kibria et al., "Next Generation New Radio Small Cell Enhancement: Architectural Options, Functionality and Performance Aspects," interarXiv: 1802.10267v1 [cs.IT] Feb. 28, 2018, pp. 1-9.
(Continued)

*Primary Examiner* — Pakee Fang
(74) *Attorney, Agent, or Firm* — Clements Bernard Baratta; Lawrence A. Baratta, Jr.

(57) ABSTRACT

Systems and methods include obtaining monitored traffic from an S1 interface; detecting a Secondary Radio Access Technology (RAT) Data Usage Report (DUR) in the monitored traffic; determining whether the Secondary RAT DUR relates to a 5G Non-Standard Architecture (NSA), and, if so, determining an address of a gNodeB in the Secondary RAT DUR; and storing the address of the gNodeB in a database. The systems and methods can include, for a call, updating a Call Detail Record (CDR) to reflect one of 5G NSA and 4G based on whether an address in the CDR is in the database.

14 Claims, 7 Drawing Sheets

(52) U.S. Cl.
CPC ...... *H04M 2215/2026* (2013.01); *H04M 2215/32* (2013.01); *H04M 2215/46* (2013.01); *H04M 2215/782* (2013.01); *H04M 2215/7873* (2013.01)

(58) Field of Classification Search
CPC ....... H04M 2215/46; H04M 2215/782; H04M 2215/7873; H04W 24/08
See application file for complete search history.

(56) References Cited

U.S. PATENT DOCUMENTS

| | | |
|---|---|---|
| 10,069,740 B2 | 9/2018 | Panchal |
| 10,334,485 B2 | 6/2019 | Chandramouli et al. |
| 10,506,506 B2 | 12/2019 | Qiao et al. |
| 10,560,204 B1 | 2/2020 | Patel et al. |
| 10,735,209 B2 * | 8/2020 | Kaki .................. H04L 12/1407 |
| 10,785,688 B2 | 9/2020 | Yau et al. |
| 10,827,395 B2 | 11/2020 | Dasgupta et al. |
| 10,904,936 B1 | 1/2021 | Zhao |
| 11,146,412 B2 | 10/2021 | Kaki et al. |
| 2012/0155324 A1 | 6/2012 | Janakiraman et al. |
| 2012/0155428 A1 | 6/2012 | Bovo et al. |
| 2012/0159151 A1 | 6/2012 | Janakiraman et al. |
| 2016/0157159 A1 | 6/2016 | Goi et al. |
| 2016/0189186 A1 * | 6/2016 | Fabrikant ........... G06Q 30/0205 705/7.34 |
| 2016/0269297 A1 | 9/2016 | Mahindra et al. |
| 2017/0289882 A1 | 10/2017 | Faccin et al. |
| 2018/0092142 A1 | 3/2018 | Han et al. |
| 2018/0139762 A1 | 5/2018 | Cho et al. |
| 2018/0227219 A1 * | 8/2018 | Zhang ..................... H04L 47/34 |
| 2018/0227699 A1 * | 8/2018 | Kim .................... H04W 64/003 |
| 2019/0053104 A1 | 2/2019 | Qiao et al. |
| 2019/0116631 A1 | 4/2019 | Talebi Fard et al. |
| 2019/0159273 A1 | 5/2019 | Shi et al. |
| 2019/0166549 A1 | 5/2019 | Ahmavaara et al. |
| 2019/0173599 A1 | 6/2019 | Au et al. |
| 2019/0215731 A1 * | 7/2019 | Qiao ..................... H04W 24/10 |
| 2019/0239123 A1 | 8/2019 | Kim |
| 2019/0253920 A1 | 8/2019 | Zhang et al. |
| 2019/0268833 A1 | 8/2019 | Kwok |
| 2019/0281587 A1 | 9/2019 | Zhang et al. |
| 2019/0320322 A1 | 10/2019 | Jayawardene et al. |
| 2019/0342800 A1 | 11/2019 | Sirotkin et al. |
| 2020/0021689 A1 | 1/2020 | Sultana et al. |
| 2020/0052916 A1 | 2/2020 | Kaki et al. |
| 2020/0205212 A1 | 6/2020 | Rahman |

FOREIGN PATENT DOCUMENTS

| | | |
|---|---|---|
| WO | 2019/105560 A1 | 6/2019 |
| WO | 2019/153300 A1 | 8/2019 |

OTHER PUBLICATIONS

Polese et al., "Integrated Access and Backhaul in 5G mmWave Networks: Potentials and Challenges," arXiv:1906.01099v1 [cs.NI], Jun. 3, 2019, pp. 1-7.
5G secondary node addition, Generated with EventStudio—https://www.EventHelix.com/EventStudio/, Feb. 19, 2020, pp. 1-2.
5G non-standalone access, "Signaling flow for 5G access via LTE-5G NR dual connectivity (EN-DC)," https://medium.com/5g-nr/5g-non-standalone-access-4d48cea5db5f, Sep. 16, 2018, pp. 1-12.
Llic-Savoia, "5G Boot Camp," Keysight Technologies, Oct. 2018, pp. 1-95.
Cisco Systems, Inc., "MME Administration Guide, StarOS Release 21.8," Apr. 26, 2018, pp. 1-732.
Cisco Systems, Inc., "Release Change Reference, StarOS Release 21.9/Ultra Services Platform Release 6.3," Jul. 31, 2018, pp. 1-222.
5G NSA for MME, NSA Solution Guide, Chapter 10, pp. 1-20.
5G secondary node addition, "LTE eNB—5G gNB dual connectivity (EN-DC)," https://www.EventHelix.com/EventStudio/, Feb. 19, 2020, pp. 1-6.
Vivo et al., "NR cell type indication," 3GPP TSG-RAN WG2 Meeting #103, R2-1811773, Aug. 20-24, 2018, pp. 1-3.
Mar. 12, 2021, European Search Report issued for European Patent Application No. EP 20 19 7777.
KT Corp., "Guidance on Secondary RAT Data Volume," 3G TSG RAN WG3 #100 Meeting, R3-182839, Agenda Item: 31.3.1.6, May 21-25, 2018, pp. 1-3.
3GPP, "3rd Generation Partnership Project; Technical Specification Group Radio Access Network; Evolved Universal Terrestrial Radio Access (E-UTRA) and NR; Multi-connectivity; Stage 2," Release 16, 3GPP TS 37.340, V16.0.0, Dec. 2019, pp. 1-72.
Sep. 27, 2021, European Search Report issued for European Patent Application No. EP 21 16 8841.

* cited by examiner

IDENTIFICATION OF 5G NON-STANDALONE ARCHITECTURE TRAFFIC ON THE S1 INTERFACE

CROSS-REFERENCE TO RELATED APPLICATION(S)

The present disclosure claims priority to U.S. Provisional Patent Application No. 63/017,342, filed Apr. 29, 2020, and entitled "IDENTIFICATION OF 5G NSA TRAFFIC ON S1," the contents of which are incorporated by reference in their entirety.

The present disclosure claims priority to U.S. Provisional Patent Application No. 63/070,338, filed Aug. 26, 2020, and entitled "Identification of 5G Non-Standalone Architecture traffic on the S1 interface," the contents of which are incorporated by reference in their entirety.

FIELD OF THE DISCLOSURE

The present disclosure generally relates to wireless networking. More particularly, the present disclosure relates to systems and methods for identifying 5G Non-Standalone Architecture (NSA) traffic on the S1 interface.

BACKGROUND OF THE DISCLOSURE

The initial deployments of 5G (fifth-generation cellular network technology) will be classified as Non-Standalone (NS), meaning that the 5G networks will be supported by existing 4G (LTE) infrastructure. In an NSA mode, 5G-enabled devices connect to 5G frequencies for data-throughput improvements but will still use 4G for non-data functions such as communication to the cell towers and servers. That is, the NSA mode depends on the control plane of the existing 4G (LTE) network for control functions, while the 5G NR (New Radio) utilizes 5G features on the user plane. The advantage of this approach is to speed up 5G adoption. The user plane (sometimes known as the data plane, forwarding plane, carrier plane or bearer plane) carries the network user traffic, whereas the control plane carries signaling traffic. The 5G NR is a Radio Access Technology (RAT) for the 5G network, i.e., the global standard for the air interface of 5G networks.

With the introduction of 5G NSA, new procedures are needed for monitoring the S1 interface. Statistics per gNodeB and Serving Gateway (SGW) are monitored, and the capability to identify 4G activity and 5G NSA activity on S1 is needed. 5G NSA activity needs to be identified based only on monitoring the S1 interface. Conventionally, it is not possible to identify all the 5G NSA activity that is managed by the S1 interface. It is, therefore, impossible to generate complete dashboards and statistics. For monitoring, there is a need to split statistics between 4G and 5G NSA and identify the type of mobility by the subscriber. There is also a need to create a dashboard per gNodeB based on monitoring the S1 interface.

BRIEF SUMMARY OF THE DISCLOSURE

The present disclosure relates to systems and methods for identifying 5G Non-Standalone Architecture (NSA) traffic on the S1 interface. Specifically, the present disclosure analyzes Secondary Radio Access Technology (RAT) Data Usage Report (DUR) messages on the S1 interface to determine the bearer type. The present disclosure includes obtaining monitored traffic from an S1 interface; detecting a Secondary Radio Access Technology (RAT) Data Usage Report (DUR) in the monitored traffic; determining whether the Secondary RAT DUR relates to a 5G Non-Standard Architecture (NSA), and, if so, determining an address of a gNodeB in the Secondary RAT DUR; and storing the address of the gNodeB in a database. The systems and methods can include, for a call, updating a Call Detail Record (CDR) to reflect one of 5G NSA and 4G based on whether an address in the CDR is in the database.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for identifying 5G Non-Standalone Architecture (NSA) traffic on the S1 interface. Specifically, the present disclosure analyzes Secondary Radio Access Technology (RAT) Data Usage Report (DUR) messages on the S1 interface to determine the bearer type. The present disclosure includes obtaining monitored traffic from an S1 interface; detecting a Secondary Radio Access Technology (RAT) Data Usage Report (DUR) in the monitored traffic; determining whether the Secondary RAT DUR relates to a 5G Non-Standard Architecture (NSA), and, if so, determining an address of a gNodeB in the Secondary RAT DUR; and storing the address of the gNodeB in a database. The systems and methods can include, for a call, updating a Call Detail Record (CDR) to reflect one of 5G NSA and 4G based on whether an address in the CDR is in the database.

The following acronyms are utilized herein:

| Term | Definition |
|---|---|
| 3GPP | 3$^{rd}$ Generation Partnership Project |
| CDR | Call Detail Record |
| DL | Downlink |
| eNodeB | Evolved Node B (4G base station) |
| EN-DC | E-UTRA-NR Dual Connectivity |
| EPC | Evolved Packet Core (EPC) which is a framework for converging voice and data in LTE (4G) and includes the MME, SGW, etc. |
| ERAB | E-UTRAN Radio Access Bearer |
| EUTRAN | Evolved Universal Mobile Telecommunications System Terrestrial Radio Access Network which is the Radio Access Technology (RAT) for the 4G |

-continued

| Term | Definition |
| --- | --- |
| gNodeB | 5G base station |
| IP | Internet Protocol |
| LTE | Long Term Evolution (4G) |
| MME | Mobility Management Entity which is the control node in the LTE (4G) access network. It is involved in the bearer activation/deactivation process and is also responsible for choosing the SGW for a UE at the initial attach and at time of intra-LTE handover involving Core Network (CN) node relocation. |
| NR | New Radio which is the Radio Access Technology (RAT) for the 5G |
| NSA | Non-Standalone Architecture |
| PGW | Packet Data Network Gateway which provides from the UE to external packet data networks by being the point of exit and entry of traffic for the UE |
| RAT | Radio Access Technology |
| SGW | Serving Gateway which routes and forwards user data packets, while also acting as the mobility anchor for the UP during inter-eNodeB handovers and as the anchor for mobility between LTE and other 3GPP technologies (terminating S4 interface and relaying the traffic between 2G/3G systems and PGW) |
| TEID | Tunnel Endpoint Identifier |
| UE | User Equipment which is a user device connecting to the mobile network. |
| UL | Uplink |
| ULI | User Location Info |
| UP | User Plane |

Figure 1:
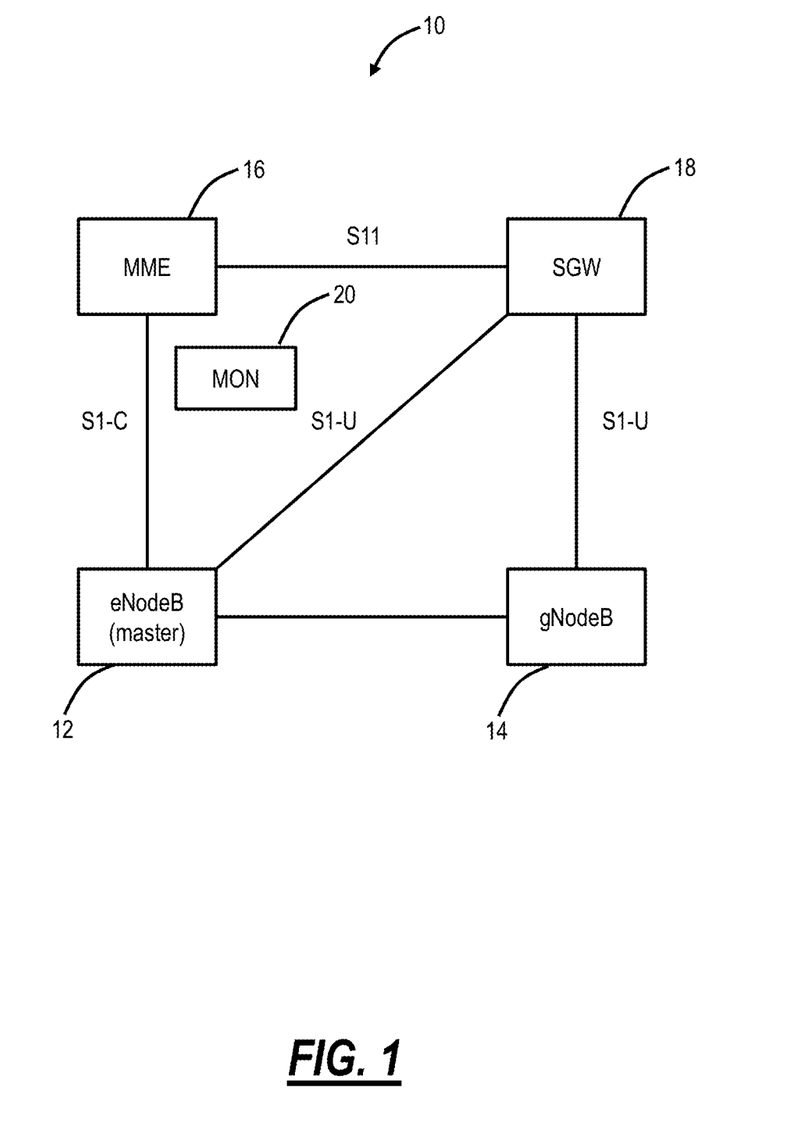
FIG. 1 is a block diagram of select interfaces in a 5G NSA system 10.

FIG. 1 is a block diagram of select interfaces in a 5G NSA system 10. The 5G NSA system 10 includes an eNodeB 12, a gNodeB 14, an MME 16, and an SGW 18. Of course, there are additional interfaces and elements in the 5G NSA system 10, which are omitted for illustration purposes. In an embodiment, there is a monitoring system 20 which can be a physical system interacting with the SGW 18 and/or MME 16, a method implemented on or with the SGW 18 and/or the MME 16, computer-readable code executed on or with the SGW 18, MME 16, etc. The monitoring system 20 is configured to capture data associated with the operation of the S1 interface in the 5G NSA system 10. Such captured data is utilized by a network operator for various network operations and management purposes.

In a 4G core network, the capture of user plane information is performed at or on the SGW 18, with the monitoring system 20. The monitoring system 20 can also capture control plane information for use with the user plane information. For example, the control plane information can include RAT type, the network element, etc. Again, the control plane information and the user plane information are captured and monitored by the monitoring system 20 for use by the network operator of the 5G NSA system 10 for various network management purposes.

In a 4G architecture, a control plane S11 interface allows a correlation between the control plane and the user plane. The RAT type (EUTRAN for 4G) and the 4G radio network element (eNodeB) are provided over the control plane S11 interface and can be included in user plane data records, such as in the monitoring system 20.

As described herein, for the monitoring system 20, a data record is a listing of data of user plane activity between a UE and an application server. The data record can provide subscriber information, network information, user plane information as the application, the exchanged data volumes, and the throughput in the downlink and uplink directions. The information of the RAT is important to capture for the network operator. The present disclosure relates, in part, to data records and 5G NR UP bearer identification.

With the 5G NSA system 10, the core network and the protocols around the SGW 18 remain the same. A bearer refers to a path that user traffic takes in a network, such as between UE and a Packet Data Network Gateway (PGW). With the 5G NSA system 10, the S1-U (S1 user plane) bearer can be either 4G or 5G, and the present disclosure relates to the identification of an S1-U bearer between the SGW and the eNodeB 12 (4G radio equipment), or the gNodeB 14 (5G radio equipment). That is, the present disclosure provides a technique for how to identify the eNodeB 12 (4G radio equipment) and the gNodeB 14 (5G radio equipment) on the S1 interface.

Secondary RAT Data Usage Report

The purpose of the Secondary RAT Data Usage Report procedure is to provides information on the used resources of the secondary RAT (e.g., NR resources during EN-DC operation) as specified in TS 23.401. The message is sent from the eNodeB 12 to the MME 16 to report Secondary RAT data usage.

Figure 2:
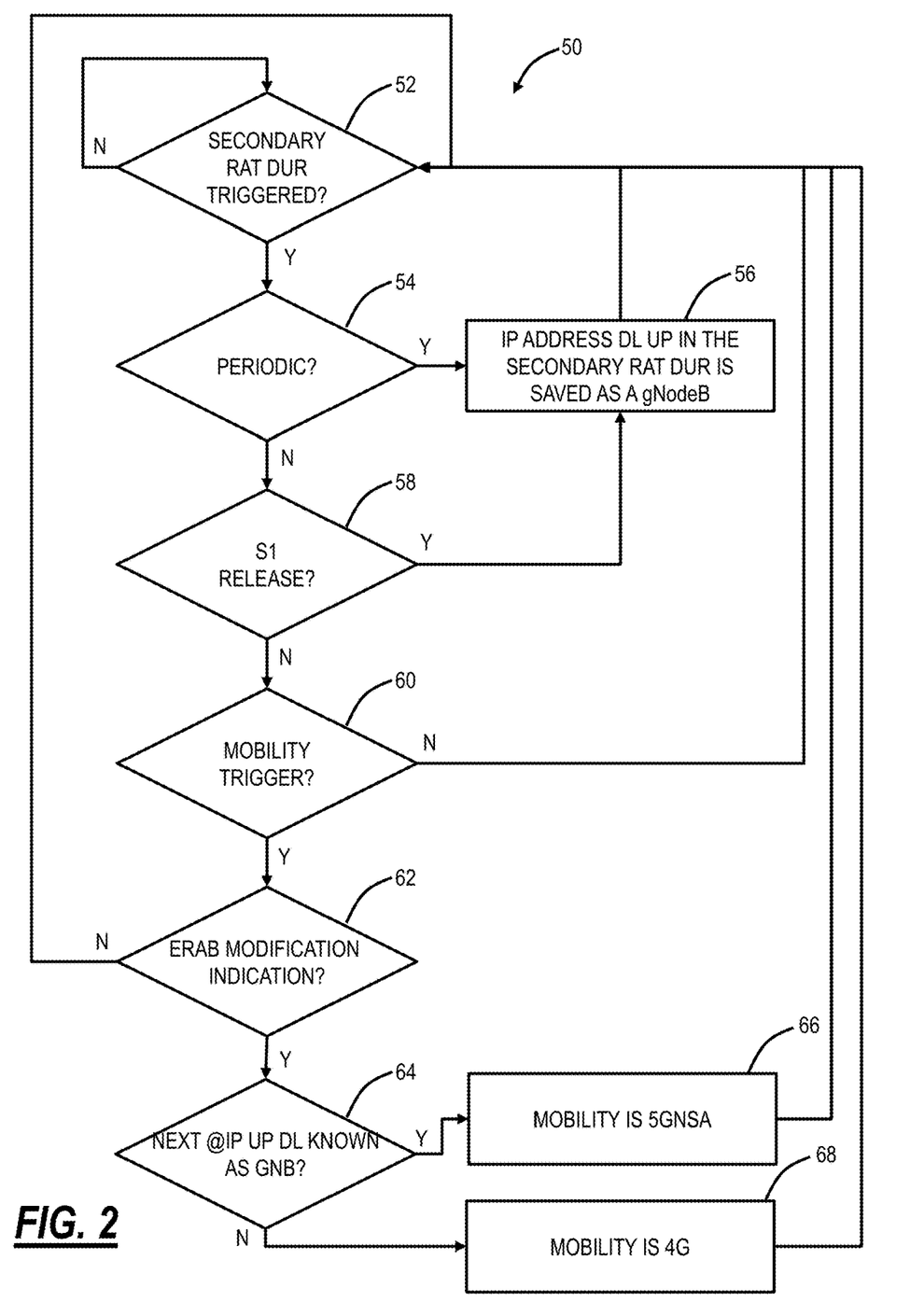
FIG. 2 is a flowchart of a process for analyzing a Secondary RAT Data Usage Report on the S1 interface to determine the type of mobility, namely 5G NSA or 4G.

FIG. 2 is a flowchart of a process 50 for analyzing a Secondary RAT Data Usage Report on the S1 interface to determine the type of mobility, namely 5G NSA or 4G.

The Secondary RAT Data Usage Report (DUR) is generated on different triggers (step 52), including periodic reporting (step 54), an S1 release (step 58), and a mobility trigger (step 60). The present disclosure includes analyzing the Secondary RAT DUR to determine the bearer type. Specifically, the following differentiation can be used to declare whether the traffic is on a gNodeB (5G NSA) or an eNodeB (4G):

If the Secondary RAT DUR was due to a periodic trigger (step 54), the "IP Address DL UP" in the Secondary RAT DUR is saved as a gNodeB (step 56); or If the Secondary RAT DUR was due to an S1 release (step 58), the "IP Address DL UP" in the Secondary RAT DUR is saved as a gNodeB (step 56). Specifically, in step 56, a database can be maintained which includes address, i.e., IP Address DL UP, and an address in the database indicates a gNodeB.

If the Secondary RAT DUR was due to a mobility trigger (step 60), this can mean that the subscriber moved from 5G NSA to another 5G NSA or from 5G NSA to 4G. In this case, it can be checked if there is an ERAB Modification Indication in the Secondary RAT DUR (step 62). If there is not an ERAB Modification Indication (step 62), the process 50 returns to step 52. If there is an ERAB Modification Indication (step 62), the process 50 includes checking if the next IP address UP DL is known as a gNodeB (step 64). The checking is based of determining whether the next IP address UP DL is in the database.

If the next IP address UP DL is in the database (step 64), the mobility is 5G NSA (step 66). Otherwise, the mobility is 4G (step 68). In the case of Secondary RAT DUR, the type of mobility the subscriber can be identified with the following algorithm that analyzes a Secondary RAT DUR with an ERAB Modification Indication:

| Previous "IP Address DL UP" | Next "IP Address DL UP" | Type of mobility |
| --- | --- | --- |
| gNodeB | ??? | mobility from 5G NSA to 4G |
| gNodeB | gNodeB | mobility from 5G NSA to 5G NSA |

Where ??? means the IP address is not in the database of known gNodeB.

Thereafter steps 66, 68, a CDR can have its mobility determined as either 4G or 5G NSA, based on the Next IP Address DL UP.

In the process 50, the IP addresses can be saved in a database to note gNodeBs for future CDRs. That is, the bearer type for a call can be based on analyzing the IP address in a CDR to see if it is a gNodeB in the database. Otherwise, the bearer type for a call is 4G, if the IP address is not in the gNodeB database. That is, the system 20 learns multiples gNodeB IP addresses and flags the subsequent CDRs which use these IP addresses as 5G NSA activity.

Figure 3:
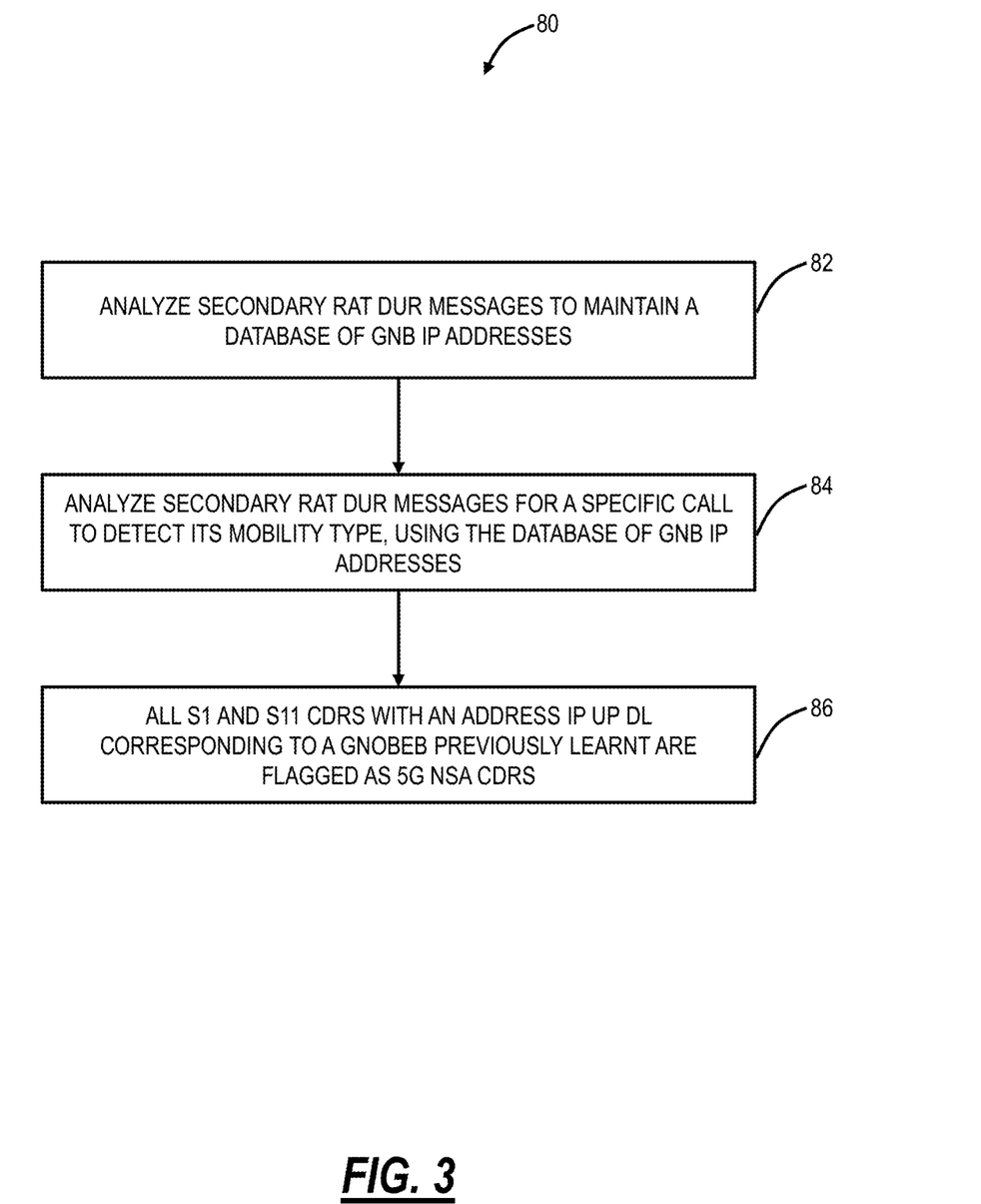
FIG. 3 is a flowchart of a summarized process for identifying 5G Non-Standalone Architecture (NSA) traffic on the S1 interface.

FIG. 3 is a flowchart of a summarized process 80 for identifying 5G Non-Standalone Architecture (NSA) traffic on the S1 interface. The process 80 includes analyzing Secondary RAT DUR messages to maintain a database of gNodeB addresses (step 82). Next, the process 80 includes analyzing Secondary RAT DUR messages for a specific call to detect its mobility type, using the database of GNB IP addresses (step 84), i.e., all Secondary RAT DUR CDRs can be analyzed and the mobility is flagged thanks to the gNobeB IPs learn before. Finally, all S1 and/or S11 CDRs with an address IP UP DL corresponding to a gNobeB previously learnt are flagged as 5G NSA, otherwise as 4G (step 86).

Figure 4:
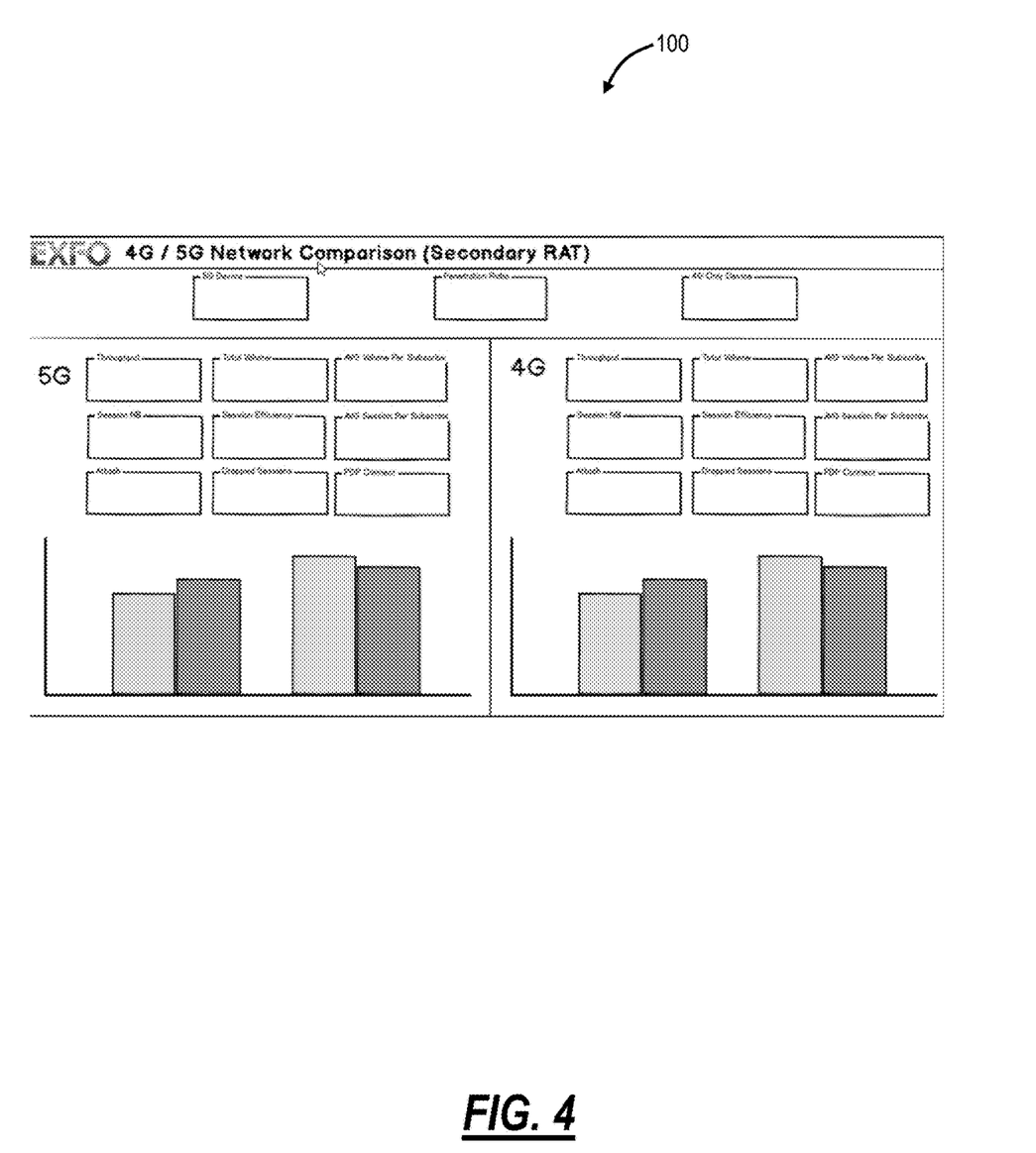
FIG. 4 is a screenshot of a user interface illustrating monitored statistics based on the Secondary RAT.
Figure 5:
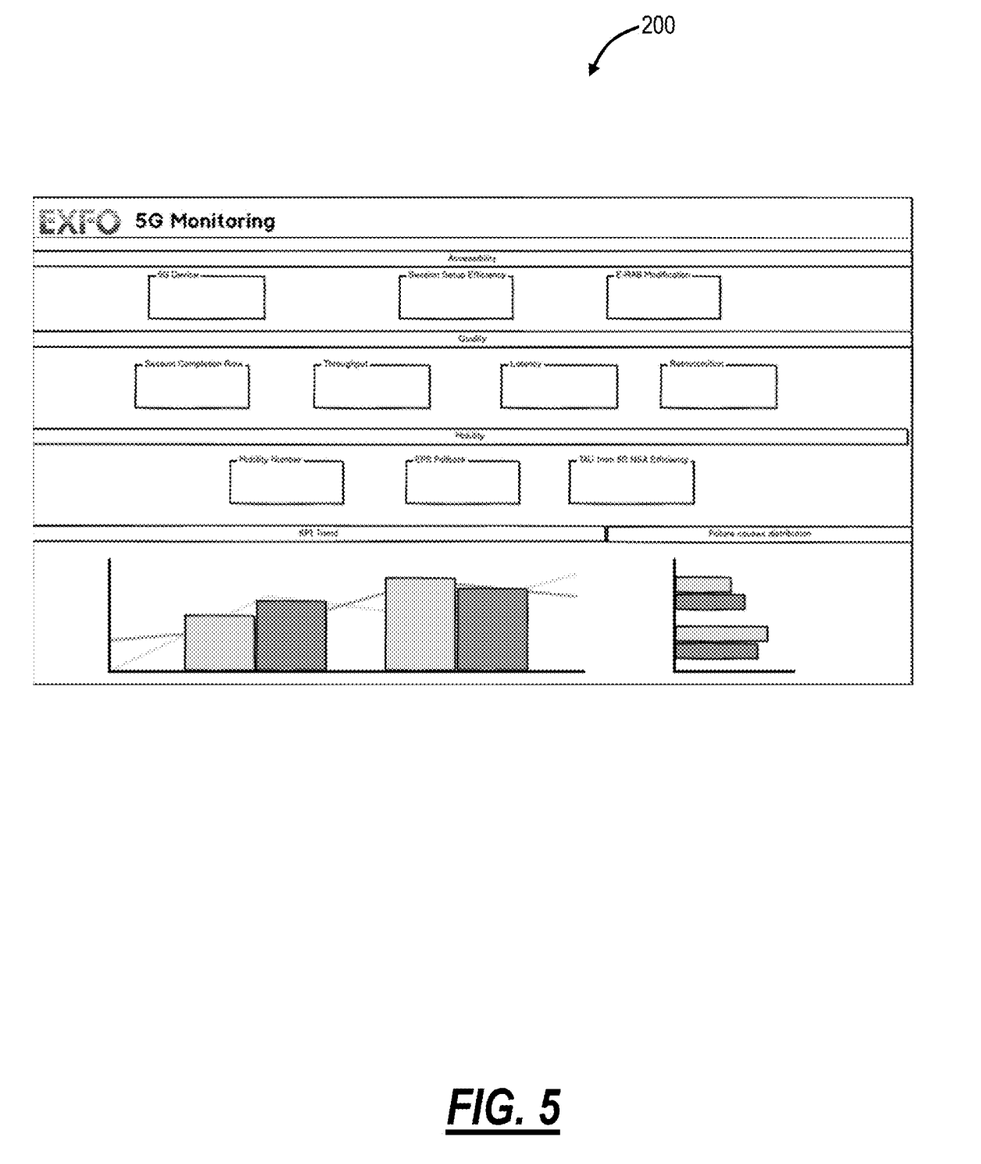
FIG. 5 is a screenshot of a user interface illustrating monitored statistics based on 5G monitoring.

FIG. 4 is a screenshot of a user interface 100, illustrating monitored statistics based on the Secondary RAT. Monitored statistics based on the secondary RAT include, in this example: throughput, total volume, A/G volume per subscriber, Session NB, Session Efficiency, NG Session per subscriber, Attach, Dropped Sessions, PDP Connect FIG. 5 is a screenshot of a user interface 200 illustrating monitored statistics based on 5G monitoring. Monitored statistics based on 5G monitoring include, in this example: session setup efficiency, E-RAB modification, session completion rate, throughput, latency, retransmission, mobility number, EPS fallback, TAU from 5G NSA Efficiency, KPI trend, failure causes distribution.

Example Processing Device Architecture

Figure 6:
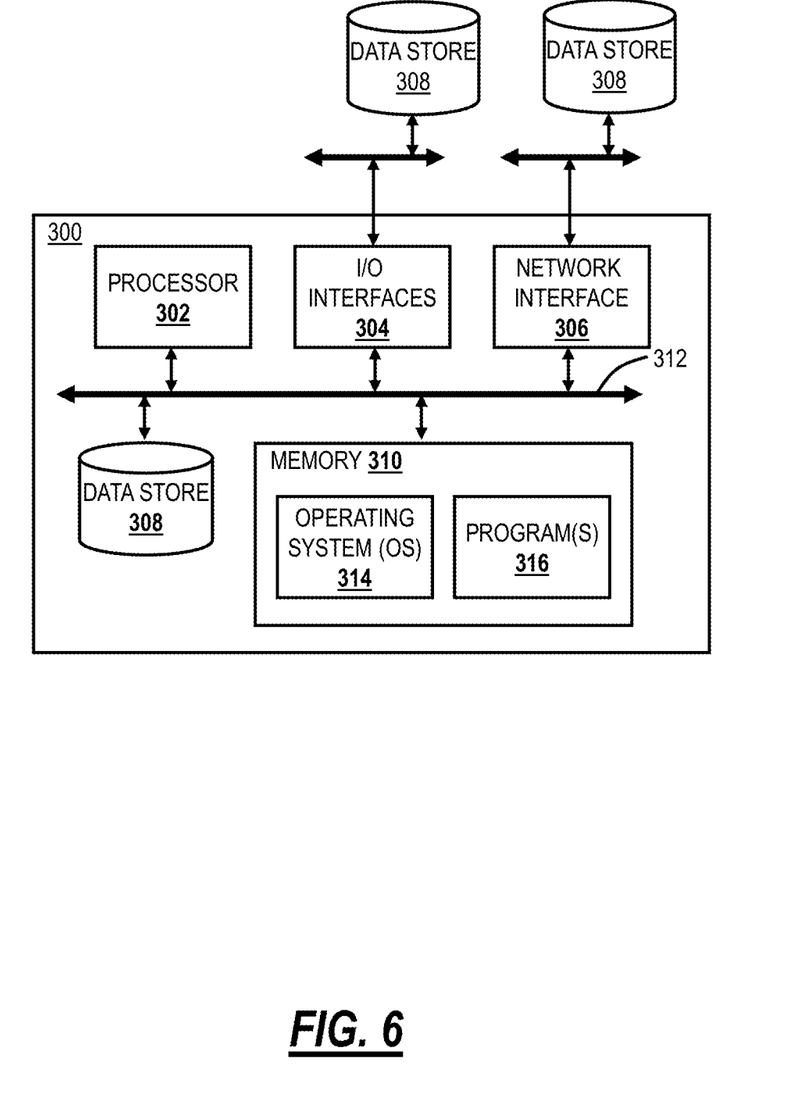
FIG. 6 is a block diagram of a processing device.

FIG. 6 is a block diagram of a processing device 300. The processing device 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 6 depicts the processing device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the processing device 300, a semiconductor-based microprocessor (in the form of a microchip or chipset), or generally any device for executing software instructions. When the processing device 300 is in operation, the processor 302 is configured to execute software stored within the memory 310, to communicate data to and from the memory 310, and to generally control operations of the processing device 300 pursuant to the software instructions. The I/O interfaces 304 may be used to receive user input from and/or for providing system output to one or more devices or components. The user input may be provided via, for example, a keyboard, touchpad, and/or a mouse. System output may be provided via a display device and a printer (not shown). I/O interfaces 304 may include, for example, a serial port, a parallel port, a Small Computer System Interface (SCSI), a Serial ATA (SATA), a fiber channel, InfiniBand, iSCSI, a PCI Express interface (PCI-x), an Infrared (IR) interface, a Radio Frequency (RF) interface, a Universal Serial Bus (USB) interface, or the like.

The network interface 306 may be used to enable the processing device 300 to communicate over the network 120, etc. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the processing device 300, such as, for example, an internal hard drive connected to the local interface 312 in the processing device 300. Additionally, in another embodiment, the data store 308 may be located external to the processing device 300, such as, for example, an external hard drive connected to the I/O interfaces 304 (e.g., SCSI or USB connection). In a further embodiment, the data store 308 may be connected to the processing device 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services.

The one or more programs 316 may be configured to implement the various processes, algorithms, methods, techniques, etc. described herein, such as with respect call direction detection. Generally, the processing device 300 is configured to analyze the Secondary RAT DUR messages on the S1 interface, to determine the IP addresses of gNodeBs based on the process 50, and to update CDR records based thereon. Specifically, if an IP address in a CDR is in a database of gNodeB addresses, then the CDR can be marked as 5G NSA, otherwise as 4G.

Method

Figure 7:
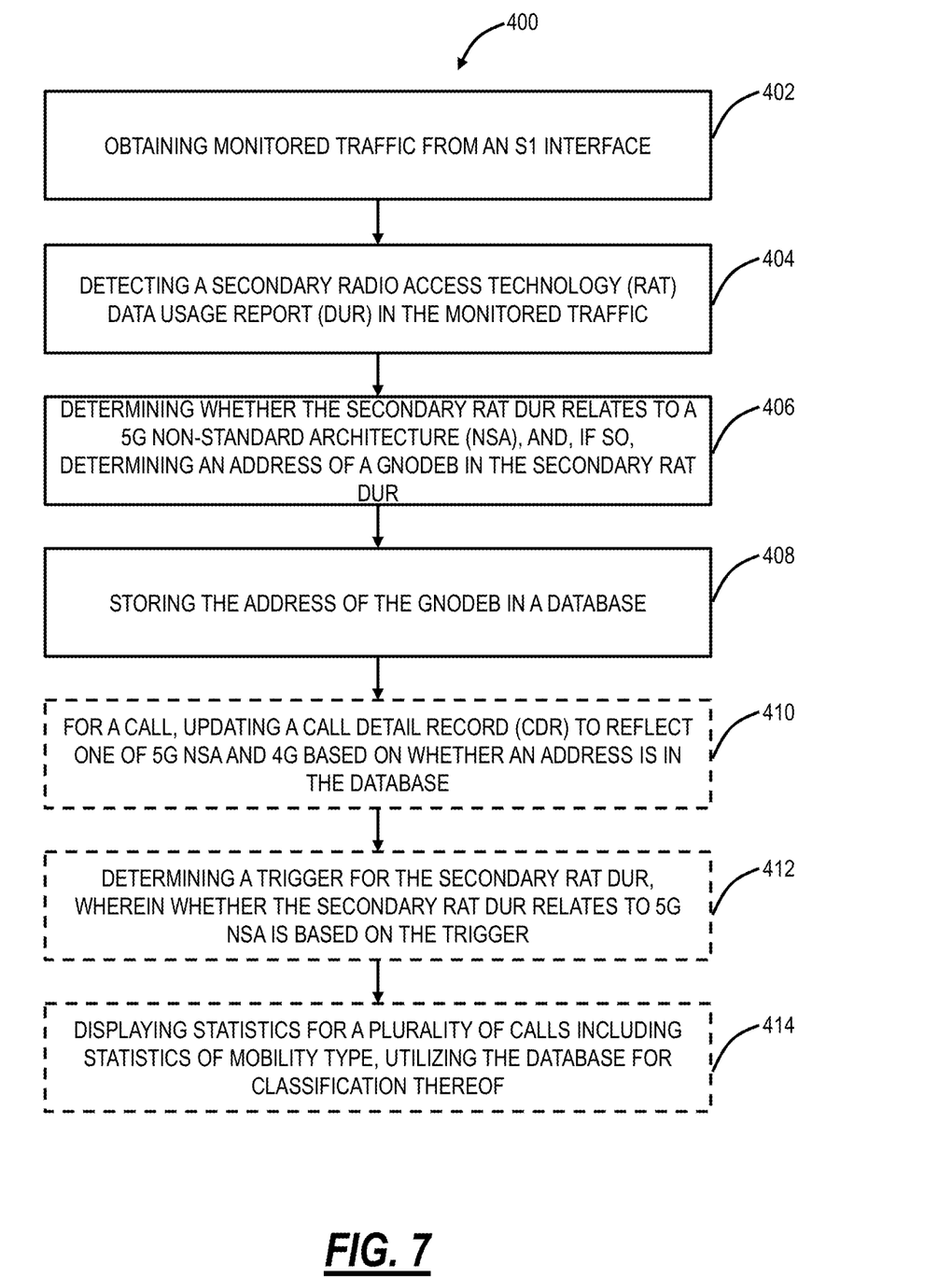
FIG. 7 is a flowchart of a method for identifying 5G Non-Standalone Architecture (NSA) traffic on the S1 interface.

FIG. 7 is a flowchart of a method 400 for identifying 5G Non-Standalone Architecture (NSA) traffic on the S1 interface. The method 400 includes obtaining monitored traffic from an S1 interface (step 402); detecting a Secondary Radio Access Technology (RAT) Data Usage Report (DUR) in the monitored traffic (step 404); determining whether the Secondary RAT DUR relates to a 5G Non-Standard Architecture (NSA), and, if so, determining an address of a gNodeB in the Secondary RAT DUR (step 406); and storing the address of the gNodeB in a database (step 408).

The method 400 can further include, for a call, updating a Call Detail Record (CDR) to reflect one of 5G NSA and 4G based on whether an address is in the database (step 410). The address can be in a Secondary RAT DUR for the call.

The method 400 can further include determining a trigger for the Secondary RAT DUR, wherein whether the Secondary RAT DUR relates to 5G NSA is based on the trigger (step 412). The trigger can be one of periodic and an S1 release and the Secondary RAT DUR relates to 5G NSA based thereon. The trigger can be a mobility trigger, wherein the Secondary RAT DUR includes an E-UTRAN Radio Access Bearer (ERAB) Modification Indication, and wherein, if an address in the ERAB Modification Indication is in the database, a mobility type is 5G NSA, and, if the address in the ERAB Modification Indication is not in the database, a mobility type is 4G.

The method 400 can further include displaying statistics for a plurality of calls including statistics of mobility type, utilizing the database for classification thereof (step 414).

A processing device can include one or more processors and memory comprising instructions that, when executed, cause the one or more processors to implement the method 400.

A computer program can include instructions which, when executed on at least one processor, cause the at least one processor to carry out the method 400. A carrier can include the computer program, wherein the carrier is one of an electronic signal, optical signal, radio signal, or computer readable storage medium.

Conclusion

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processing device to perform steps of:
   obtaining monitored traffic from an S1 interface;
   detecting a Secondary Radio Access Technology (RAT) Data Usage Report (DUR) in the monitored traffic;
   determining whether the Secondary RAT DUR relates to a 5G Non-Standard Architecture (NSA) based on a mobility trigger in the Secondary RAT DUR, and, if so, determining an address of a gNodeB in an E-UTRAN Radio Access Bearer (ERAB) Modification Indication in the Secondary RAT DUR; and
   storing the address of the gNodeB in a database that is queried to determine if a subsequent address, in another ERAB Modification Indication, is in the database such that the subsequent address has a mobility type of 5G NSA, and, if the subsequent address is not in the database, the mobility type is 4G.

2. The non-transitory computer-readable medium of claim 1, wherein the steps further include
   for a call, updating a Call Detail Record (CDR) to reflect one of 5G NSA and 4G based on whether an address is in the database.

3. The non-transitory computer-readable medium of claim 2, wherein the address is in a Secondary RAT DUR for the call.

4. The non-transitory computer-readable medium of claim 1, wherein the trigger is one of periodic and an S1 release and the Secondary RAT DUR relates to 5G NSA based thereon.

5. The non-transitory computer-readable medium of claim 1, wherein the steps further include
   displaying statistics for a plurality of calls including statistics of mobility type, utilizing the database for classification thereof.

6. A method comprising:
   obtaining monitored traffic from an S1 interface;

detecting a Secondary Radio Access Technology (RAT) Data Usage Report (DUR) in the monitored traffic;

determining whether the Secondary RAT DUR relates to a 5G Non-Standard Architecture (NSA) based on a mobility trigger in the Secondary RAT DUR, and, if so, determining an address of a gNodeB in an E-UTRAN Radio Access Bearer (ERAB) Modification Indication in the Secondary RAT DUR; and storing the address of the gNodeB in a database that is queried to determine if a subsequent address, in another ERAB Modification Indication, is in the database such that the subsequent address has a mobility type of 5G NSA, and, if the subsequent address is not in the database, the mobility type is 4G.

7. The method of claim 6, further comprising for a call, updating a Call Detail Record (CDR) to reflect one of 5G NSA and 4G based on whether an address is in the database.

8. The method of claim 7, wherein the address is in a Secondary RAT DUR for the call.

9. The method of claim 6, wherein the trigger is one of periodic and an S1 release and the Secondary RAT DUR relates to 5G NSA based thereon.

10. The method of claim 6, further comprising displaying statistics for a plurality of calls including statistics of mobility type, utilizing the database for classification thereof.

11. A processing device comprising:

one or more processors and memory comprising instructions that, when executed, cause the one or more processors to obtain monitored traffic from an S1 interface;

detect a Secondary Radio Access Technology (RAT) Data Usage Report (DUR) in the monitored traffic;

determine whether the Secondary RAT DUR relates to a 5G Non-Standard Architecture (NSA) based on a mobility trigger in the Secondary RAT DUR, and, if so, determining an address of a gNodeB in an E-UTRAN Radio Access Bearer (ERAB) Modification Indication in the Secondary RAT DUR; and store the address of the gNodeB in a database that is queried to determine if a subsequent address, in another ERAB Modification Indication, is in the database such that the subsequent address has a mobility type of 5G NSA, and, if the subsequent address is not in the database, the mobility type is 4G.

12. The processing device of claim 11, wherein the instructions that, when executed, cause the one or more processors to for a call, update a Call Detail Record (CDR) to reflect one of 5G NSA and 4G based on whether an address is in the database.

13. The processing device of claim 12, wherein the address is in a Secondary RAT DUR for the call.

14. The processing device of claim 11, wherein the trigger is one of periodic and an S1 release and the Secondary RAT DUR relates to 5G NSA based thereon.

* * * * *